United States Patent [19]

Gerwers

[11] Patent Number: 5,000,533

[45] Date of Patent: Mar. 19, 1991

[54] PROTECTIVE SLEEVES FOR SCOPE PROBES FOR USE IN HIGH PRESSURE OR VACUUM ENVIRONMENTS

[75] Inventor: Hank Gerwers, Princeton, N.J.

[73] Assignee: Olympus Corporation, Lake Success, N.Y.

[21] Appl. No.: 491,414

[22] Filed: Mar. 9, 1990

[51] Int. Cl.$^5$ ............................................. G02B 23/26
[52] U.S. Cl. ................................. 350/96.20; 350/96.25; 350/96.26
[58] Field of Search ............... 350/96.20, 96.21, 96.22, 350/96.25, 96.26, 96.10; 356/241; 128/4, 6; 285/39, 149

[56] References Cited

U.S. PATENT DOCUMENTS

| | | | |
|---|---|---|---|
| 3,778,170 | 12/1973 | Howell et al. | 356/241 |
| 3,841,764 | 10/1974 | Snell et al. | 350/96.26 X |
| 4,209,228 | 6/1980 | Chikama | 350/96.26 |
| 4,277,168 | 7/1981 | Oku | 350/96.26 |
| 4,530,568 | 7/1985 | Haduch et al. | 350/96.26 |
| 4,575,185 | 3/1986 | Wentzell et al. | 350/96.26 |
| 4,640,124 | 2/1987 | Diener et al. | 350/96.26 X |
| 4,696,544 | 9/1987 | Costella | 350/96.26 |
| 4,711,524 | 12/1987 | Morey et al. | 350/96.25 |
| 4,770,443 | 9/1988 | Yamamoto | 285/39 |
| 4,784,463 | 11/1988 | Miyazaki | 350/96.26 |
| 4,830,491 | 5/1989 | Grace | 356/241 |
| 4,834,394 | 5/1989 | Katz et al. | 277/12 |

FOREIGN PATENT DOCUMENTS

| | | | |
|---|---|---|---|
| 58-62612 | 4/1983 | Japan | 350/96.26 X |
| 1-229220 | 9/1989 | Japan | 350/96.26 X |

*Primary Examiner*—Brian Healy
*Attorney, Agent, or Firm*—Kenyon & Kenyon

[57] ABSTRACT

Protective sleeve, into which a conventional fiberscope or videoscope is inserted, is mounted so as to extend into a high pressure or high/ultra-high vacuum chamber to permit insopections or monitoring therewithin. In a first embodiment the protective sleeve comprises first and second body portions, each comprised of bellows-like flexible stainless steel. The second section has a length substantially corresponding to the articulatable distal end of a fiberscope or videoscope to be articulatable therewith. In a second embodiment, the first body portion is rigid, and axially displaceable relative to a gimballed mounting assembly through which it passes into the chamber. In a third embodiment, the first body portion comprises a shape memory ally. In both the second and third embodiments the second body portion, as in the first embodiment, comprises flexible stainless steel so as to be articulatable upon the articulation of a probe disposed therein. In a fourth embodiment, the first body portion is flexible stainless steel and the second body portion is rigid.

10 Claims, 3 Drawing Sheets

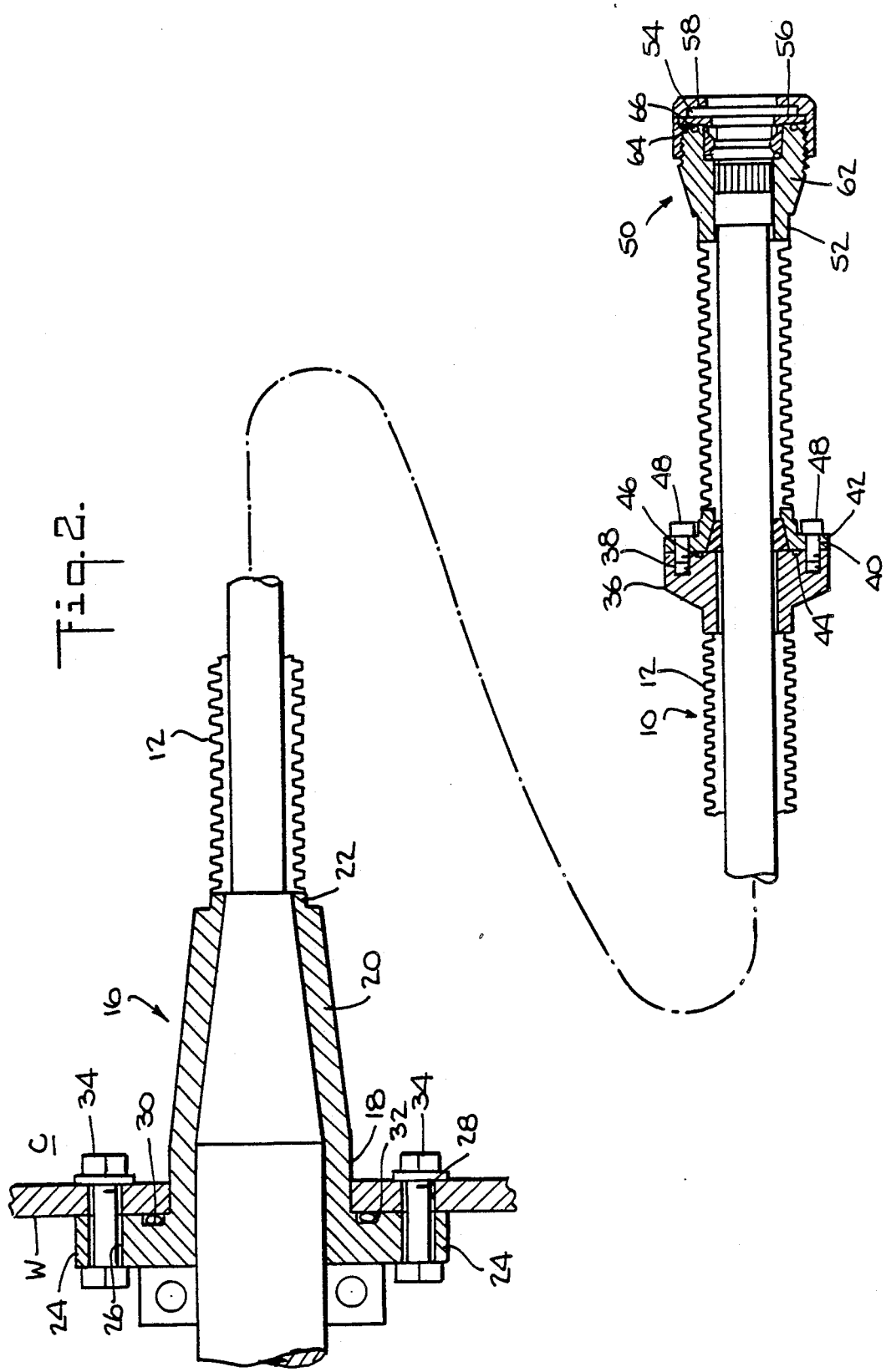

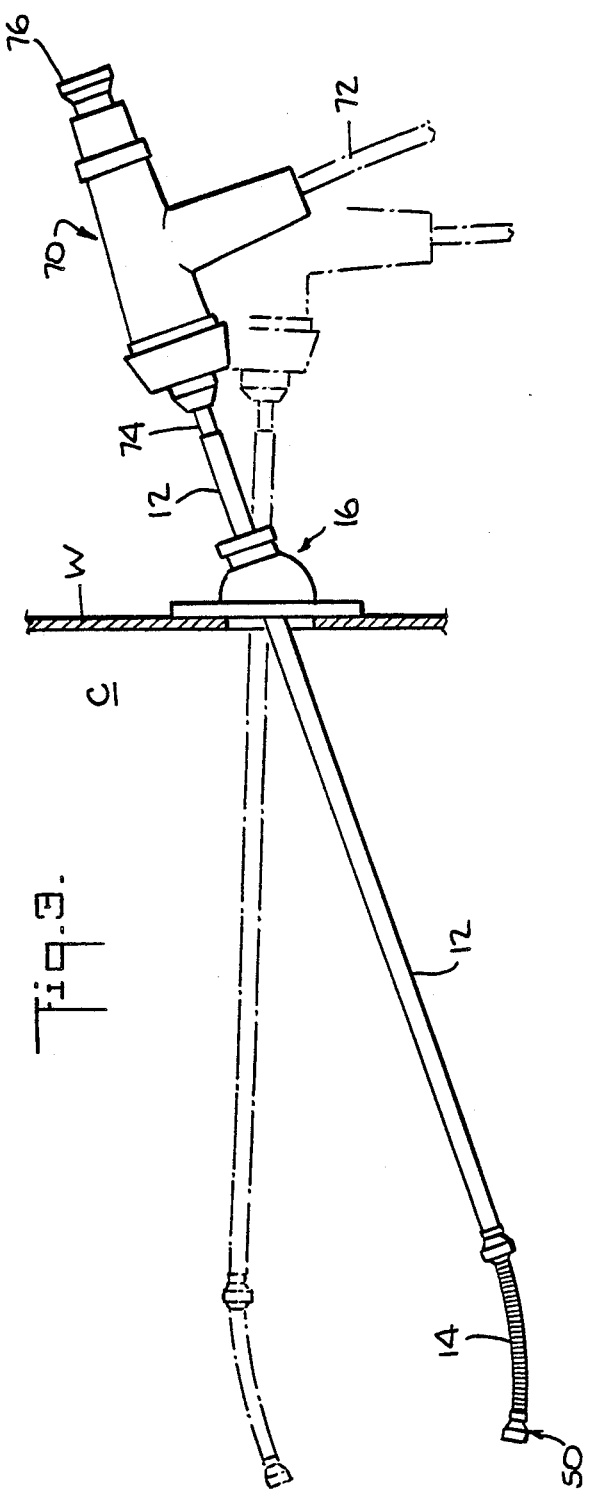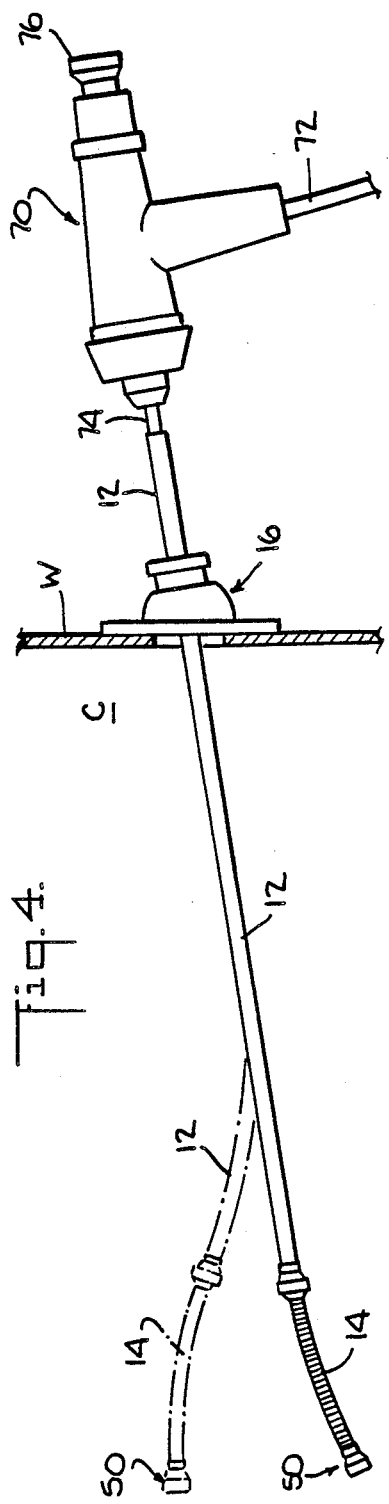

PROTECTIVE SLEEVES FOR SCOPE PROBES FOR USE IN HIGH PRESSURE OR VACUUM ENVIRONMENTS

BACKGROUND OF THE INVENTION

The present invention relates to a protective sleeve for use with a fiberscope, a videoscope or the like, and in particular to a protective sleeve that will permit the safe insertion of the probe of such a device into a high pressure or high/ultra-high vacuum environments.

There are many manufacturing processes carried on in a high pressure environment, or in high/ultra-high vacuum environments, in which it would be advantageous to observe from the outside of such pressurized or vacuum environments the progress of the manufacturing process underway. Examples, offered without intending any limitation on the uses to which the present invention may be put, involve MBE technology, vacuum brazing, autoclave monitoring, or in situ spectroscopy.

The only option formerly available to one wishing to inspect such processes underway was through the naked eye via an observation window, if present, in a wall of the pressure or vacuum chamber.

An improvement over that disadvantageous method was offered by U.S. Pat. No. 4,209,228 assigned on its face to Machida Endoscope Co., Ltd. of Tokyo, Japan. According to that patent, means are provided in the probe and/or the soope body proper to equalize the inner and exterior pressures of the hermitioally sealed scope when the probe is inserted into a high pressure environment. A disadvantage of tho embodiments disclosed in the foregoing patent is the need to burden the construction of the probe and/or scope body with pressure equalizing means. The patent also only addresses high pressure environments, and does not address the heretofore recognized need to inspect high or ultra-high vacuum environments.

Accordingly, it is among the objects of the present invention to provide apparatus to permit the inspection, or monitoring of events therein, of the interiors of high pressure, and high/ultra-high vacuum environments, and to permit such inspections or monitoring with a conventional fiberscope or videoscope without the need for the pressure-equalizing means of the above-described patent.

SUMMARY OF THE INVENTION

These and other objects of the present invention, which will be readily apparent to those skilled in the art, are accomplished by the use of a conventional fiberscope or videoscope in conjunction with the protective sleeve of the present invention.

In accordance with a first embodiment of the present invention the protective sleeve comprises a relatively long first body portion and a shorter second body portion, both of which have longitudinal bores to accommodate the insertion of a probe of a fiberscope, videoscope or the like. The length of the first and second body portions may be varied as desired. In the illustrative embodiments described herein, the second body portion preferably has a length substantially corresponding to the length of the articulatable distal end of a conventional fiberscope or videoscope probe. Both the first body portion and the second body portion are made of a commercially available bellows-like, flexible stainless steel tubing. The first body portion is made of tubing having slightly less flexibility than that of the second body portion, it being appreciated that the second body portion preferably will be more readily articulatable in response to the articulation of the distal end of the probe when the probe is inserted into the protective sleeve.

The proximate end of the first body portion carries a mounting means to mount the sleeve to the wall of a chamber, such as a high pressure chamber or a vacuum chamber, to provide a pressure-resistant seal between the interior and exterior environments of the chamber.

The distal end of the first body portion carries a collar welded thereto in a pressure-resistant manner. The collar mates with a collar welded, also in a pressure-resistant manner, to the proximate end of the second body portion. The distal end of the second body portion is connected to a viewing section by means of a pressure-resistant weld at a cylindrical collar on the viewing section. The viewing section includes a window, which may be made of plexiglass or other suitable transparent material.

In use, the protective sleeve of the invention will be installed so as to extend into the interior of a chamber which may be pressurized or evacuated. A conventional fiberscope or videoscope, which is connectable via a cable to a separate light source or monitor, may then be used to inspect the interior of the chamber (or monitor events therewithin) by insertion of the elongated probe of a conventional fiberscope or videoscope so that the articulatable distal end of the probe resides in the second body portion. It will be appreciated that the optics at the distal end of the probe (e.g., the bundle through which light is emitted, and the bundle through which the image being viewed or scanned) will be immediately adjacent to the window provided in the viewing section. The bellows-like construction of the second body portion is freely articulatable, and can readily accommodate fiberscopes or videoscopes that articulate in two directions or in four directions.

Second and third embodiments of the present invention each differ from the first embodiment in that the first body portions of these alternative embodiments are not flexible as in the first embodiment, and the mounting means of the second and third embodiments is a gimballed device permitting pivotal movement of the first body portion which is mounted through the mounting means. The mounting means of the second and third embodiments is of a known ball and socket type device, capable of providing an effective seal between the interior and exterior of the chamber, and around the outer surface of the first body portion. The first body portion may be displaced relative to the sealing means to be inserted farther, or retracted toward the wall of the chamber.

In accordance with the second embodiment of the present invention, the first body portion is rigid, and comprises stainless steel tubing or other suitable pressure-resistant material. In accordance with the third embodiment of the present invention, the first body portion comprises a shape-memory alloy or laminate. In both embodiments, the second body portion comprises bellows-like flexible stainless steel, and includes the viewing means of the first embodiment.

Finally, a fourth embodiment, similar to the first embodiment, may be provided in which the first body portion may be made of the bellows-like flexible stainless steel, to which is attached a rigid second body portion. While the distal-most portion of the sleeve would not be articulatable, the longer first body portion would be flexible enough to permit the sleeve to be maneuvered into various positions or configurations.

BRIEF DESCRIPTION OF THE DRAWINGS

For a better understanding of the present invention, the scope of which will be pointed out in the appended claims, reference is made to the following detailed descriptions of exemplary embodiments thereof, taken in conjunction with the accompanying drawings, in which:

FIG. 2 is a cross-sectional view of the embodiment of the protective sleeve illustrated in FIG. 1;

FIG. 3 is a side view of a second embodiment of the protective sleeve of the present invention; and FIG. 4 is a side view of a third embodiment of the protective sleeve of the present invention.

DETAILED DESCRIPTIONS OF EXEMPLARY EMBODIMENTS

Figure 1:
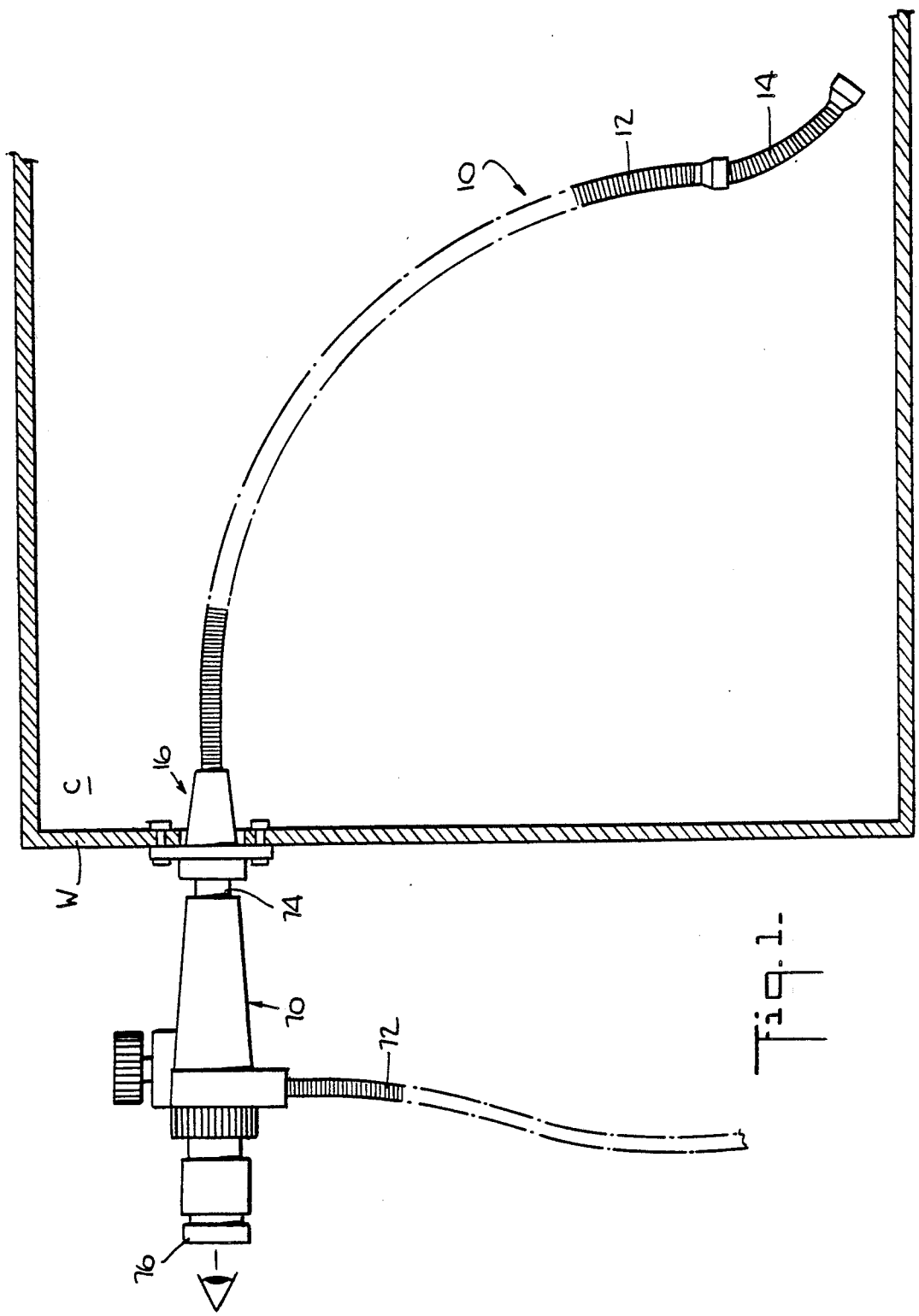
FIG. 1 is a side view of a first embodiment of the protective sleeve of the present invention, shown mounted on a wall of and extending into a chamber having an environment at a pressure other than atmospheric pressure, and further illustrating a conventional scope, such as a fiberscope or videoscope, with its probe extending into the protective sleeve of the invention.

With reference to FIGS. 1 and 2, there is illustrated a protective sleeve 10 constructed in accordance with a first embodiment of the present invention. The sleeve 10 comprises a relatively long first body portion 12 and a shorter second body portion 14, both of which have longitudinal bores to accommodate the insertion of a probe of a fiberscope, a videoscope or the like. The length of the sleeve 10 (i.e., either or both of body portions 12 and 14) may be varied as desired bearing in mind, for example, the application(s) to which the instrument will be put to use. In the illustrative embodiments described herein, the second body portion 14 preferably has a length substantially corresponding to the length of the articulatable distal end of a conventional fiberscope or videoscope, i.e., approximately 2.5 to 4.5 inches, usually about 3.5 inches.

In this first embodiment, both the first body portion 12 and the second body portion 14 are made of a commercially available bellows-like, flexible stainless steel tubing. As discussed more fully below, the present invention also contemplates that either one of the first and second body portions may be rigid, while the other body portion comprises flexible tubing. The first body portion 12 is made of a tubing having slightly less flexibility than that of the second body portion 14, it being appreciated that the second body portion 14 preferably will be more readily articulatable in response to the articulation of the distal end of a probe when the probe is inserted into the protective sleeve for use in a high pressure or vacuum chamber.

The proximate end of the first body portion 12 carries a mounting means 16 to mount the sleeve to the wall W of a chamber C, such as a high pressure chamber or a vacuum chamber. The mounting means 12 comprises a cylindrical body portion 18, taper portion 20 and a cylindrical neck 22 to which the first body portion 12 is welded in a pressure resistant manner. The cylindrical body portion 18 has a circular flange 24 having screw holes 26 therein which align with screw holes 28 provided in the wall W of the chamber C. An O-ring 30 (or suitable metal seal) is seated in an annular groove 32 provided in the face of the flange 24 to provide a pressure resistant seal when bolts 34 are tightened down to secure the locking means to the wall W of the chamber C.

The distal end of the first body portion 12 carries a collar 36 welded thereto in a pressure resistant manner. The collar 36 has screw holes 38 which align with screw holes 40 provided on a collar 42 welded, also in a pressure-resistant manner, to the proximate end of the second body portion 14. An 0-ring 44 (or suitable metal seal) is disposed in an annular groove 46 provided in the face of the collar 36 abutting the collar 42, to provide a pressure resistant seal between the collar 36 and 42 when screws 48 are inserted through the screw holes 40 and 38 and tightened down therein.

The distal end of the second body portion 14 is connected to a viewing section 50 by means of a pressure resistant weld at a cylindrical collar 52 on the viewing section 50. The viewing section 50 includes a window 54, which may be made of plexiglass or other suitable transparent material. The window 54 is held in place between a pressure ring 56 and a screw cap 58 which is threaded to the body portion 62 of the viewing section 50. The pressure ring 56 is itself seated against the face of the body portion 62 of the viewing means. Beneath the pressure ring 56, the face of the body portion 62 is provided with an annular groove 64 in which an O-ring 66 (or suitable metal seal) is disposed to ensure a pressure resistant seal.

In use, the protective sleeve of the invention will be installed so as to extend into the interior of a chamber which may be pressurized or evacuated. A conventional fiberscope or videoscope 70, which is connectable via a cable 72 to a separate light source (not shown), may then be used to inspect or monitor events inside the interior of the chamber C by insertion of the elongated probe 74 of the fiberscope or videoscope so that the articulatable distal end of the probe 74 resides in the second body portion 14. It will be appreciated that the optics at the distal end of the probe 74 (e.g., the bundles of a fiberscope or the CCD chip for a videoscope, used to transmit an image to the eyepiece 76 or a camera control unit ("CCU")) will be immediately adjacent to the window 54 provided in the viewing section 50. The bellows-like construction of the second body portion is freely articulatable, and can readily accommodate fiberscopes or videoscopes that articulate in two directions or in four directions.

The present invention permits inspection of chambers having pressures up to about 130-140 psi (about 9-10 bar) with ambient temperatures up to 1000° C., and in ultra-high vacuum chambers with a range down to $1 \times 10^{-9}$ torrs.

With respect to FIGS. 3 and 4, there are illustrated second and third embodiments, respectively, of the present invention, like reference numerals representing like parts throughout the drawings. These embodiments each differ from the first embodiment of FIGS. 1 and 2 in that the first body portions of these alternative embodiments are not flexible as in the first embodiment, and the mounting means 16 of each alternative embodiment is a gimballed device permitting pivotal movement of the first body portion 12 which is mounted through the mounting means 16.

The mounting means 16 of the second and third embodiments is of a known ball and socket type device, capable of providing an effective seal between the interior and exterior of the chamber, and around the outer surface of the first body portion 12. The first body portion 12 may be displaced relative to the sealing means 16 so that the viewing means 50 on the distal end of the flexible second body portion 14 may be inserted farther into the chamber, or withdrawn closer to the wall of the chamber through which the sleeve has been inserted. Such a known mounting means is disclosed, for example, in U.S. Pat. No. 4,834,394 issued May 30, 1989 and assigned on its face to North American Philip Corporation, the disclosure of which is incorporated herein by reference.

In accordance with the second embodiment of the present invention, the first body portion is rigid, and comprises stainless steel tubing or other suitable pressure-resistant material. In accordance with the third embodiment of the present invention, the first body portion comprises a shape-memory alloy or laminate. In both embodiments, the second body portion 14 comprises bellows-like flexible stainless steel, and includes the viewing means of the first embodiment hereinbefore described.

Finally, a fourth embodiment of the present invention may be provided, similar to the first embodiment except that the first body portion comprises flexible tubing, and the second, distal-most body portion comprises rigid tubing.

It is contemplated that the scope probe may be inserted into the sleeve at the time of manufacture, or alternatively, at an inspection site after the mounting means 16 has been affixed to the pressure or vacuum chamber. At least with respect to the first and fourth embodiments, which do not specifically contemplate displacement of the probe longitudinally within the sleeve when the probe is in use (as opposed to the second and third embodiments) it will be preferable to connect the probe body and mounting means at the time of manufacture.

While the present invention has been described with reference to exemplary embodiments thereof, it will be appreciated by those skilled in the art that variations and modifications may be made thereto without departing from the spirit of the inventive concepts disclosed herein. All such variations and modifications are intended to fall within the scope of the claims appended hereto.

I claim:

1. A protective sleeve through which an elongate probe of a fiberscope, a videoscope or the like may be inserted into a chamber having an internal environment, such as a high pressure or high/ultra-high vacuum environment, other than the environment of the exterior of said chamber, said protective sleeve comprising:

a first body portion comprising a pressure-resistant material and having a proximate end, a distal end and an axial bore;

a second body portion comprising a pressure-resistant material and having a proximate end, a distal end and an axial bore;

connecting means on at least one of said distal end of said first body portion and said proximate end of said second body portion, to connect said first and second body portions together in a pressure-tight manner, whereby said axial bores of said first and second body portions are in substantial alignment;

mounting means carried on said first body portion for mounting said first body portion to a wall of said chamber in a manner so as to seal said interior and exterior environments from each other, whereby said probe extends from the exterior of said chamber through said axial bores to the distal end of said second body portion; and viewing means including at least one window on said distal end of said second body portion.

2. The protective sleeve according to claim 1, wherein said pressure-resistant material of at least one of said first body portion and said second body portion is flexible.

3. The protective sleeve according to claim 2, wherein said pressure-resistant material of said second body portion is flexible, whereby said second body portion may be selectively articulated by the selective articulation of a distal end of a probe inserted therein.

4. The protective sleeve according to claim 2, wherein said pressure-resistant material of said first body portion is flexible.

5. The protective sleeve according to claim 2, wherein the pressure-resistant material of said first body portion is flexible and said pressure-resistant material of said second body portion is flexible.

6. The protective sleeve according to claim 1, wherein said pressure-resistant material of said first body portion comprises a shape memory alloy.

7. The protective sleeve according to claim 2, wherein said pressure-resistant material of said first body portion comprises a shape memory alloy.

8. The protective sleeve according to claim 1, wherein said first body portion extends through said mounting means carried on said first body portion, and said mounting means includes means to permit universal movement of said first body portion.

9. The protective sleeve according to claim 8, wherein said first body portion is displaceable relative to said mounting means whereby the distal end of said first body portion may be withdrawn closer to or inserted farther from the wall of said chamber.

10. The protective sleeve according to any of claims 1-9, wherein said pressure-resistant material comprises stainless steel.

* * * * *